United States Patent
Denney et al.

(10) Patent No.: US 6,546,836 B1
(45) Date of Patent: Apr. 15, 2003

(54) CONTINUOUS PLATFORM CUTTING APPARATUS FOR CUTTING A CELLULAR POLYMER SURFACE

(75) Inventors: Denys Denney, Bear, DE (US); Jose D. M. Contreras, Fontana, CA (US)

(73) Assignee: Foamex L.P., Linwood, PA (US)

( * ) Notice: Subject to any disclaimer, the term of this patent is extended or adjusted under 35 U.S.C. 154(b) by 0 days.

(21) Appl. No.: 08/899,292

(22) Filed: Jul. 23, 1997

(51) Int. Cl.$^7$ .............................. B26D 7/08; B29C 67/20
(52) U.S. Cl. .............................. 83/874; 83/176; 83/425; 83/435; 83/435.2; 83/856; 264/160; 264/163; 425/289; 425/335; 425/362; 425/373
(58) Field of Search .................. 83/870, 871, 874, 83/19, 176, 424, 425, 425.2, 425.3, 435, 435.2, 856, 858; 264/46.3, 148, 157, 160, 163, 293, 321; 425/289, 335, 362, 371, 373; 69/9.3, 10, 21, 21.5; 29/557

(56) References Cited

U.S. PATENT DOCUMENTS

| | | | |
|---|---|---|---|
| 795,359 A | * 7/1905 | Moore | 264/163 X |
| 801,673 A | * 10/1905 | Moore | 264/163 X |
| 1,038,560 A | * 9/1912 | Gay | 83/874 X |
| 1,038,561 A | * 9/1912 | Gay | 83/874 X |
| 1,952,177 A | * 3/1934 | Macdonald | 69/10 X |
| 1,964,969 A | 7/1934 | Werner | |
| 1,971,087 A | 8/1934 | Werner | |
| 2,695,571 A | 11/1954 | Kalmeijer | |
| 3,081,496 A | 3/1963 | Moore | |
| 3,165,912 A | * 1/1965 | Grossmann | 69/10 |
| 3,186,271 A | * 6/1965 | Kaiser | 83/874 |
| 3,240,855 A | 3/1966 | Voelker | |
| 3,497,120 A | 2/1970 | Fischer et al. | |
| 3,631,693 A | * 1/1972 | Morletto | 69/10 |
| 3,653,291 A | 4/1972 | Babcock | |
| 3,690,203 A | * 9/1972 | Huttemann | 83/176 X |
| 3,730,031 A | 5/1973 | Huttemann | |
| 3,800,650 A | 4/1974 | Schroder | |
| 3,840,923 A | 10/1974 | Bos | |

(List continued on next page.)

FOREIGN PATENT DOCUMENTS

| | | |
|---|---|---|
| BE | 551358 | 10/1956 |
| DE | 3310921 | 9/1984 |
| DE | G9010105.7 | 9/1990 |
| FR | 1336014 | 7/1963 |

Primary Examiner—Clark F. Dexter
(74) Attorney, Agent, or Firm—Connolly Bove Lodge & Hutz LLP

(57) ABSTRACT

An apparatus for continuously shaping a compressible or cellular polymer material, such as polyurethane foam, by cutting portions of the material from a surface of a slab of the material includes a compression roller, a support surface, a blade and a moving patterned platform interposed between the compression roller and the support surface. The moving patterned platform, preferably an endless belt or a series of interconnected panels, defines at least one recess, and may define a pattern of recesses of complex or simple shapes and at various depths. When the slab of cellular polymer material is compressed between the compression roller and the support surface, a portion of the material fills the recess or recesses in the moving patterned belt. The blade then transversely cuts from the surface of the slab a portion of the material within the recesses in the platform just as the slab emerges from between the compression roller and the support surface. After the cut portions are removed, the resulting product has a profile-cut surface with cut-out portions corresponding in mirror image to the pattern and shape of the recesses. Depending upon the compression factor of the material, the cut-out portions will substantially correspond in depth to the recesses provided on the moving patterned platform.

18 Claims, 4 Drawing Sheets

U.S. PATENT DOCUMENTS

| | | |
|---|---|---|
| 4,128,369 A | 12/1978 | Kemerer et al. |
| 4,148,855 A | 4/1979 | Stalter et al. |
| 4,278,482 A | 7/1981 | Poteet et al. |
| 4,290,248 A | 9/1981 | Kemerer et al. |
| 4,351,211 A | 9/1982 | Azzolini |
| 4,603,445 A | 8/1986 | Spann |
| 4,683,791 A | 8/1987 | Demont |
| 4,686,724 A | 8/1987 | Bedford |
| 4,700,447 A | 10/1987 | Spann |
| 4,740,258 A | 4/1988 | Breitscheidel |
| 4,748,792 A | 6/1988 | Jeffrey |
| 4,901,387 A | 2/1990 | Luke |
| 4,915,000 A | 4/1990 | MacFarlane |
| 5,059,111 A | 10/1991 | Mössinger et al. |
| 5,129,295 A | 7/1992 | Geffros et al. |
| 5,252,278 A | 10/1993 | Spann et al. |
| 5,299,483 A | 4/1994 | Ber-Fong |
| 5,331,874 A | 7/1994 | Foster et al. |
| 5,413,807 A | 5/1995 | Duggan et al. |
| 5,477,573 A | 12/1995 | Bonaddio et al. |
| 5,534,208 A * | 7/1996 | Barr et al. .................. 83/19 X |
| 5,573,350 A | 11/1996 | Stegall |
| 5,611,222 A * | 3/1997 | Preece et al. ............. 83/874 X |
| 5,688,538 A * | 11/1997 | Barr et al. .................. 83/19 X |
| 5,749,993 A * | 5/1998 | Denney et al. ............. 83/19 X |

* cited by examiner

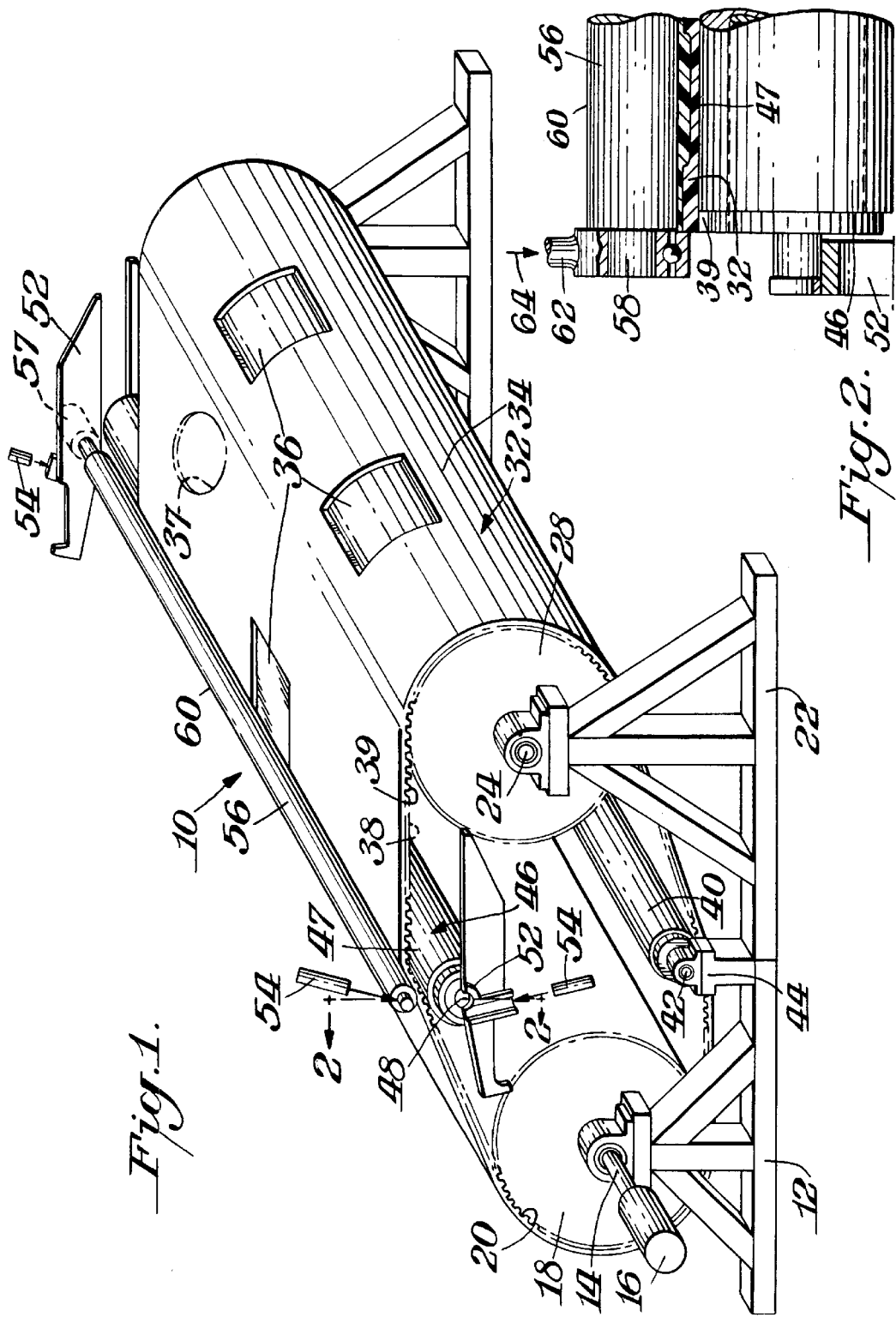

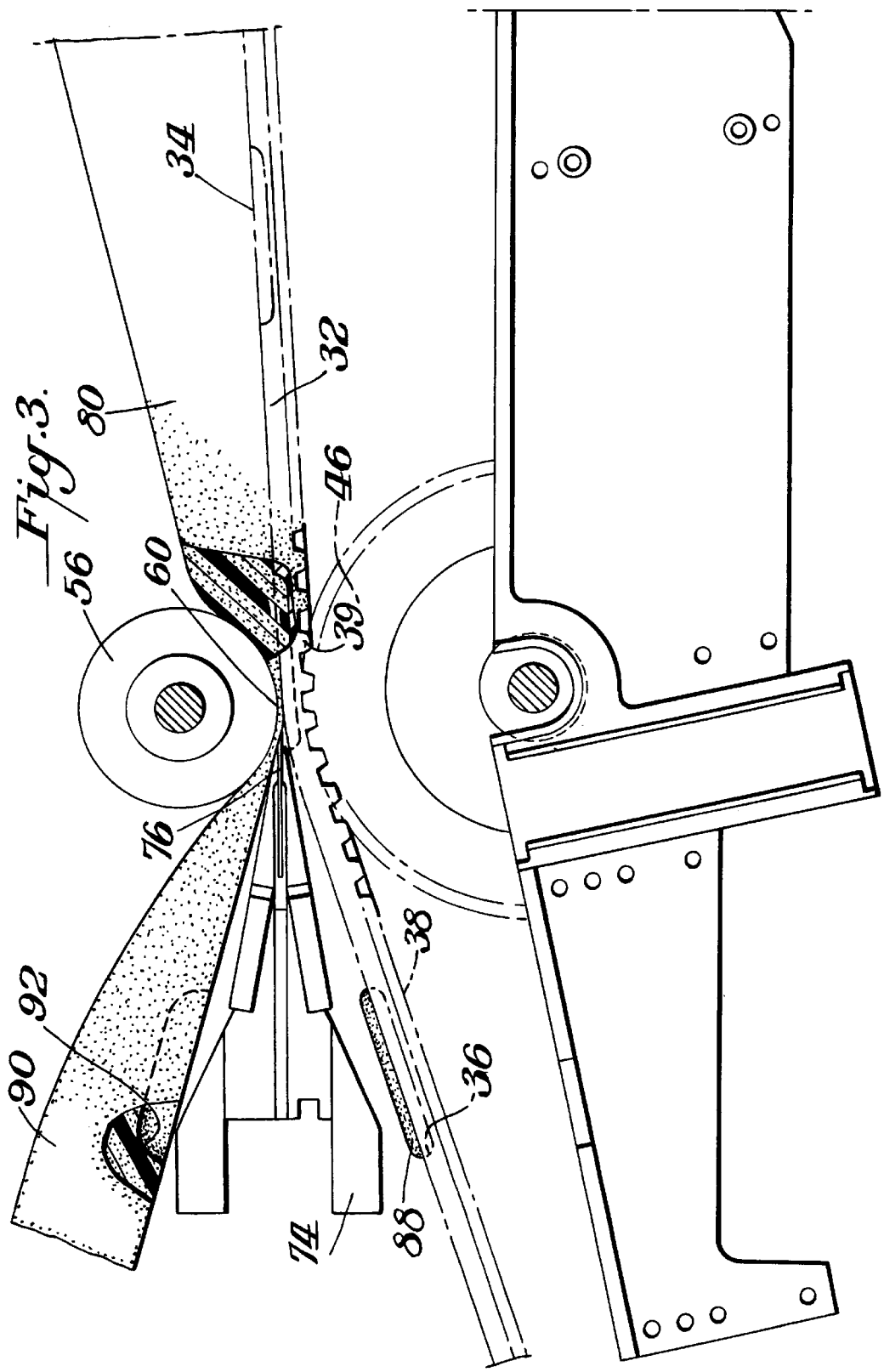

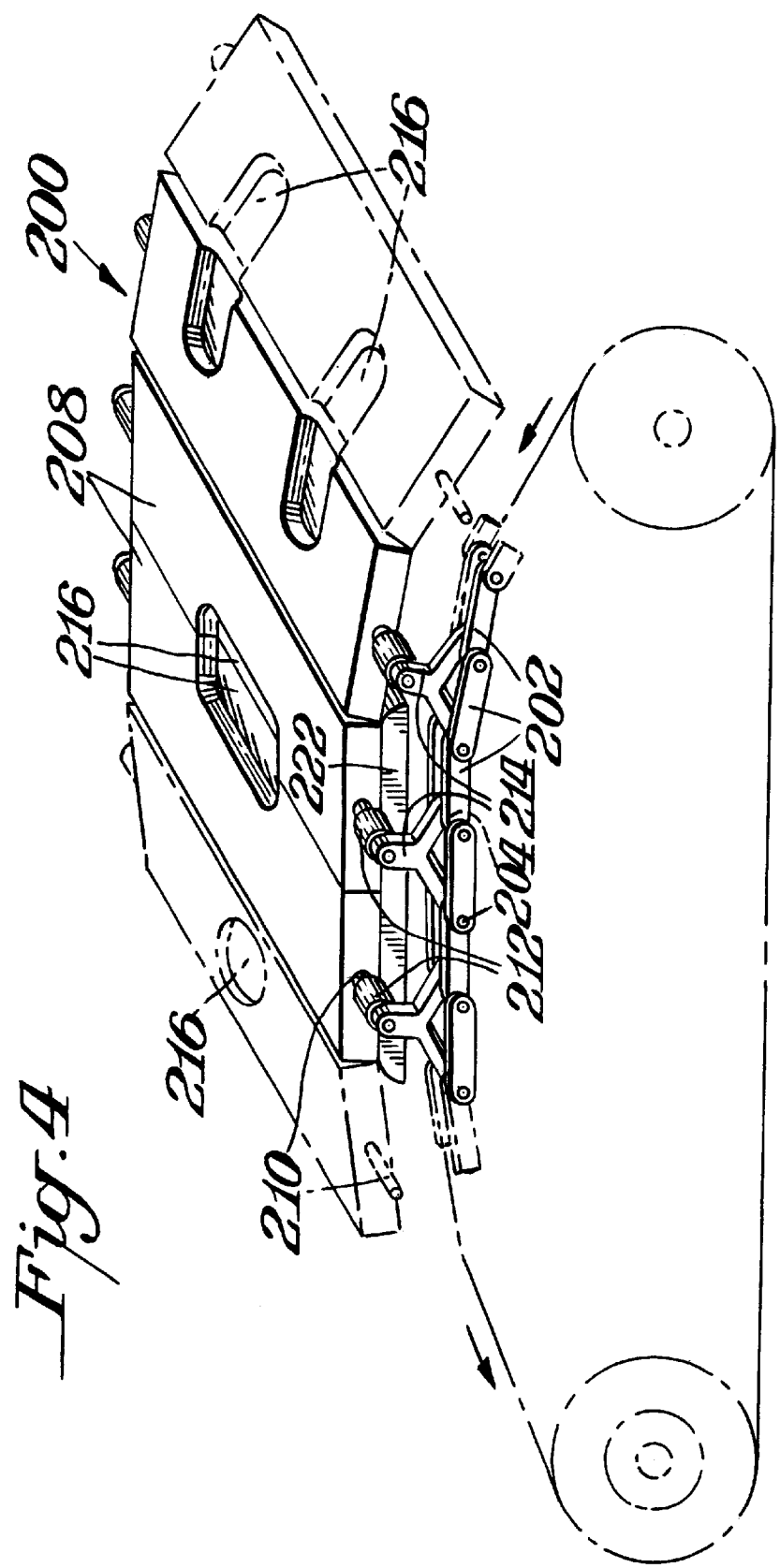

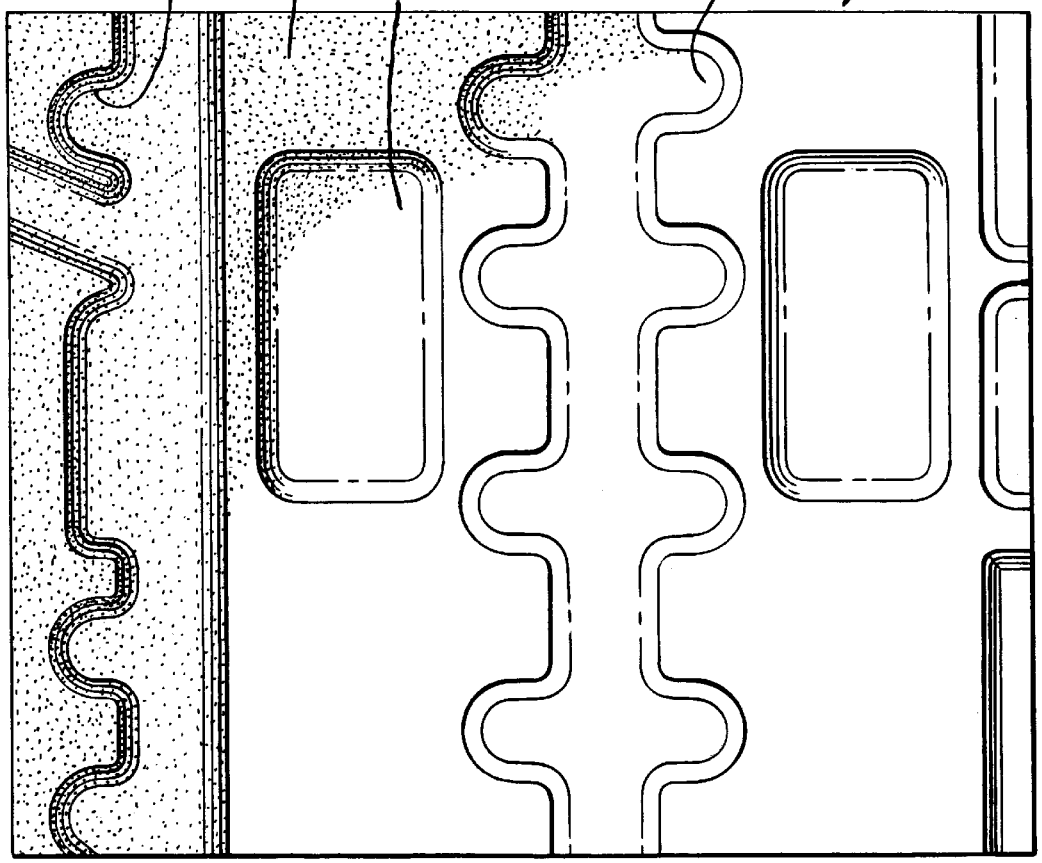

CONTINUOUS PLATFORM CUTTING APPARATUS FOR CUTTING A CELLULAR POLYMER SURFACE

CROSS-REFERENCE TO RELATED APPLICATIONS

Three related applications were filed concurrently with the present application. U.S. Ser. No. 08/899,460, filed Jul. 23, 1997, titled Methods for Cutting a Cellular Polymer Surface with Multiple Continuous Platforms; U.S. Ser. No. 08/899,418, filed Jul. 23, 1997, titled Apparatus for Cutting a Cellular Polymer Surface with Multiple Continuous Platforms; and U.S. Ser. No. 08/899,398, filed Jul. 23, 1997, titled Method of Cutting a Cellular Polymer Surface with a Continuous Platform Cutting Apparatus.

Another related application is U.S. Ser. No. 595,573, filed Feb. 1, 1996, titled Precut Conforming Foam Underlayment for Automotive Floor Pan Carpeting.

BACKGROUND OF THE INVENTION

The present invention relates to apparatus for continuously shaping the surface of a slab of compressible or cellular polymer material, such as polyurethane foams. A blade cuts portions of the compressible material from the surface of the slab after the slab has been compressed between a compression roller and a movable patterned platform.

Several methods and apparatus for cutting slabs of cellular polymer materials have been disclosed in the prior art. For example, U.S. Pat. No. 4,700,447 to Spann discloses convolute-cutting slabs of polyurethane foam by compressing a slab or pad of foam between a pair of rolls with opposed spaced projecting fingers arranged in a pattern and cutting the foam with a saw blade transversely just as it emerges from the rolls. The cut slab is then separated into two pads each with convolute-cut surfaces forming a series of peaks separated by valleys. The valleys formed on one pad are formed by slicing away foam which becomes a mating peak or projection on the other pad. Spann then shaves the peaks to form a more planar top surface. As noted in Spann, convolute cutting alone produces only rounded peaks and rounded valleys, and it is difficult, if not impossible, to produce a cut surface with peaks having substantially flat top surfaces or with recesses having substantially straight side walls. The convolute usually is intended to form the classic symmetrical and repeating "egg crate" pattern of peaks and valleys. To achieve a planar upper surface at other than the recessed portions the tops of the peaks must be cut or shaped in a second step.

Compressible cellular polymer materials may also be cut using a hot wire cutter. A slab of such material is cut by moving the slab relative to one or more hot wires as shown, for example, in U.S. Pat. No. 4,683,791 (Demont). Only straight cuts in regular or symmetrical patterns may be formed using a hot wire cutter. See also U.S. Pat. No. 4,915,000 (MacFarlane) and U.S. Pat. No. 5,573,350 (Stegall).

Shapes may be cut into the surface of a slab of cellular polymer material using a punch cutting apparatus, such as disclosed in U.S. Pat. No. 5,299,483 (BerFong). A block of the cellular material is pressed against a template so that a portion of the material is forced through an opening in the template. The exposed material is then cut by a blade and removed, leaving a recess or cavity in the slab. This method cuts one block of material at a time, and only one surface at a time.

U.S. Pat. No. 4,351,211 (Azzolini) compresses a block of foam material against a template or die having an aperture therein using a pair of plates with concave and convex portions. The compressed foam is transversely cut along the template as it is held between the plates. More complex cut regions may be obtained than when using a template without the plates with raised and depressed portions, but only one block is cut at a time. Other template or pattern cutting methods are shown in U.S. Pat. No. 3,800,650 (Schroder) and U.S. Pat. No. 3,653,291 (Babcock).

The surface of a cellular polymer material may be shaped by molding or embossing, as opposed to cutting. U.S. Pat. No. 4,383,342 (Forster), for example, discloses injecting the foam-forming composition into a mold cavity. After sufficient curing time, the individual foamed article is removed from the mold. Other one-shot molding techniques and apparatus are known to persons of skill in the art. The molded cellular polymer product generally forms a tough skin at the surfaces that were in contact with the mold.

Continuous and semi-continuous molding processes are also known. These processes have the same drawbacks associated with one-shot molding techniques. For example, U.S. Pat. Nos. 4,128,369 and 4,290,248 (Kemerer, et al.) disclose an apparatus and method for impression molding thermoplastic products. The thermoplastic material in a liquid state is injected between compressed traveling belt molds. As the belt molds travel away from the point of introduction of the thermoplastic, they are cooled, which in turns cools the thermoplastic material, allowing it to solidify. The hardened molded thermoplastic material is removed from between the belts to form the finished product. Kemerer does not show a method for cutting or shaping a cellular polymer material, such as polyurethane foam.

A method of embossing a foam surface using a patterned metallic embossing belt or band is shown in U.S. Pat. No. 4,740,258 (Breitscheidel). The foam is heated and then pressed against the embossing belt. The belt is removed after the foam surface cools. The embossed surface by design has a hardened skin. No method for cutting or shaping the foam is disclosed.

U.S. Pat. No. 5,534,208 (Barr) discloses a continuous rotary method for surface shaping synthetic foams in which the foam is compressed between a compression roller and a die roller having raised and recessed portions. The portions of the foam extruded into the recesses in the die roller are cut away. The compressed foam portions return to an uncompressed state after passing through the rollers. As a result, a mirror-image pattern to the pattern on the surface of the die roller is cut on the surface of the foam. The diameter of the die roller limits the length of the shaped synthetic foam article that may be formed.

The prior art does not disclose an apparatus for continuously shaping a compressible or cellular polymer material of unlimited length by cutting to form recesses of various depths and various symmetrical and nonsymmetrical shapes. Nor does the prior art disclose a profile cut product without the hardened skin or hard spots associated with molded or embossed products. Nor does the prior art disclose cutting compressible or cellular polymer materials with an apparatus that includes a movable patterned platform, such as an endless belt or a series of connected panels defining at least one recess or void into which the cellular material may be compressed before cutting the material transversely with a knife blade.

SUMMARY OF THE INVENTION

An apparatus for continuously shaping a compressible or cellular polymer material, such as polyurethane foam, by cutting and removing portions of the material is disclosed. A compression roller and a support surface compress a slab of cellular polymer material. A moving patterned platform interposed between the compression roller and the support surface defines one or more recesses or voids that hold a portion of the cellular material as it is compressed by the roller. A knife blade positioned downstream from the compression roller and support surface, preferably with the blade interposed between the compression roller and the patterned platform, cuts the slab transversely just as it emerges from between the compression roller and the support surface, thus trimming off those portions of the cellular material that filled the recesses or voids in the patterned platform. The blade may be positioned to shave a fine scrim layer of foam from the slab surface, but preferably the blade cuts away foam material only from those portions of the surface at which it is intended that voids or recesses be formed.

Preferably the support surface is an idler roller and the compression roller is motor driven. The patterned platform is also preferably motor driven.

The patterned platform may be an endless belt or a series of movable panels or plates or any other structure that may travel in a continuous circuit or path. Where the patterned platform is an endless belt, the belt is placed over a series of rollers wherein at least one such roller is motor driven. The belt may be engaged to the drive roller with interconnecting gears or ribs so that the rotation of the drive roller causes the belt to travel. Where the patterned platform is formed by a series of interconnected panels, such as metal plates, the panels preferably are connected movably to a chain and sprocket drive system. Thus when the sprocket is driven, such as by a motor, the sprocket drives the chain and the panels interconnected to the chain.

The patterned platform defines at least one recess, which may be a hole or void through the platform, but preferably is a cut-out portion that does not pass through the entire thickness of the platform. The recess may be provided as a simple or complex geometric shape. Where more than one recess is defined in the platform, the recesses may be of the same or different shapes, may be interconnected or separated, may be symmetrical or nonsymmetrical, and may be repeating or non-repeating on the patterned surface of the patterned platform. The recesses may be cut to different depths in the platform. Several separate series of different recesses may be provided on one patterned platform.

As the slab travels with the patterned platform and is compressed between the rollers, a portion of the cellular material fills the recesses or voids in the patterned platform. Greater amounts of cellular material are cut from the slab in regions that have been compressed into the recesses or voids in the patterned platform because this material has been forced to one side of the cutting edge of the blade in these regions. The cut portions are removed from the slab after it passes the knife. The resulting profile cut product has on its cut face a series of cut regions that substantially correspond in pattern and shape in mirror image to the recesses or voids provided in the patterned platform. The cut regions in the slab are also cut deeper in those regions that correspond to the deeper recesses in the patterned platform. However, due to the varying compression factors for cellular polymer materials, the depth of cut of the cut regions usually is not identical to the depth of cut of the recesses within the patterned platform.

Using the apparatus according to the invention, a profile cut cellular product in which portions have been cut from both the upper and lower surface may be formed by feeding the slab through the apparatus twice. First one surface is cut, then the cut product is inverted and fed through the apparatus a second time to cut its opposite surface.

DESCRIPTION OF THE FIGURES

Numerous other objects, features and advantages of the invention shall become apparent upon reading the following detailed description taken in conjunction with the accompanying drawings, in which:

FIG. 1 is a schematic perspective view of one embodiment of the continuous platform cutting apparatus of the invention;

FIG. 2 is a cross-sectional view taken along line 2—2 of FIG. 1;

FIG. 3 is a side elevational view of the embodiment of the invention shown in FIG. 1;

FIG. 4 is a schematic perspective view of an alternate moving platform for the continuous platform cutting apparatus of the invention;

FIG. 5 is a fragmental side elevational view of a cellular polymer underlayment mat defining patterned recesses that have been cut into the mat using the continuous platform cutting apparatus of the invention; and FIG. 6 is a top plan view of the mat of FIG. 5.

DESCRIPTION OF THE PREFERRED EMBODIMENTS

Referring first to the embodiment of the invention as shown in FIGS. 1–3, a continuous platform profile cutting apparatus 10 for compressible or cellular polymer materials is supported on a first frame structure 12 and second frame structure 22. A shaft 14 is mounted for rotation to the first frame structure 12, preferably with bearings. A motor 16 drives the shaft 14. A drive roller 18 is mounted on shaft 14. The outer surface of the drive roller 18 may be covered or coated with a slip resistant material, such as urethane. Ribs or gear teeth 20 are provided around the outer end or peripheral end surfaces of the first drive roller 18. Alternatively, separate gears with suitable gear teeth may be provided at each end of the first drive roller 18.

Shaft 24 is mounted for rotation to the second frame structure 22, preferably using bearings. A first follower roller 28 is mounted on shaft 24. The outer surface of the first follower roller 28 may be covered or coated with a slip resistant material, such as urethane.

A patterned platform, such as endless patterned belt 32, has a patterned facing surface 34 and an opposite surface 38. Belt 32 is mounted around the drive roller 18 and first follower roller 28. The belt facing surface 34 defines recesses 36, which may be simple or complex shapes, simple geometric patterns, complex patterns, symmetrical or repeating patterns or non-symmetrical and non-repeating patterns. Rectangular 36 and circular 37 recesses are shown by way of example in FIG. 1. The recesses may be provided at various depths as discussed in more detail below.

Mating ribbed sections 39 on the outer edges of the belt opposite surface 38 mate with or engage the ribs or gear teeth 20 provided on the drive roller 18. When the motor 16 drives shaft 14, which in turn rotates drive roller 18, the endless belt 32 travels around the drive roller 18 and the first follower roller 28. The mated ribbed sections 39 and ribs 20 and the frictional engagement between the contacting surfaces of the belt with the rollers keep the belt centered and aligned with the rollers as it travels a path around the rollers.

First idler roller 40 is mounted for rotation on shaft 42 which is held by a portion 44 of the frame 12. First idler roller 40 is positioned at a point between the drive roller 18 and the first follower roller 28 to stabilize the movement of the endless belt 32.

Compression roller 46 is provided at a point between the drive roller 18 and the first follower roller 28. The compression roller 46 is mounted for rotation on shaft 48. The shaft 48 is held in a bearing recess within a frame 52. Tension adjusting means 54, such as a fluid cylinder or spring or series of springs, may act on frame 52 to adjust the compression force applied.

The outer surface 47 of the compression roller 46 contacts the opposite surface 38 of the belt 32. The outer surface 47 of the compression roller may be covered or coated with a slip resistant material, such as urethane. As shown best in FIG. 2, the surface 47 of the compression roller 46 does not extend to the full outer periphery of the roller, leaving a recess into which the ribbed portions 39 extend so that the surface 47 of the roller 46 contacts the surface 38 of the belt 32. Greater slip resistance results when the amount of surface engagement between the belt 32 and the roller compression surface 47 is increased.

Compression roller 56 with outer compression surface 60 is mounted for rotation on shaft 58. The shaft 58 is held within frame 52. A motor 57 drives shaft 58. The roller 56 is separated from compression roller 46, leaving a space or gap through which the endless belt 32 travels between the compression surfaces of the rollers. The arrow 64 in FIG. 2 indicates the force applied against the frame 52 to urge roller 56 toward roller 46.

Referring to FIG. 3, knife blade 76 or other cutting blade is held within casing 74. The blade 76 must have a sharp tip that is sufficiently sharp to cut transversely slabs of cellular polymer materials, such as polyurethane foams. Because the blade 76 construction is known and understood by persons of skill in the art of cutting cellular polymer materials, such as polyurethane foams, it will not be described in detail.

The blade 76 is positioned adjacent to the compression rollers 46, 56 so that the sharp tip of the blade is at the output side of the rollers and adjacent to or just beyond the point at which the outer surfaces 47, 60 of the compression rollers 46, 56 act to their greatest extent to compress material that is placed between the rollers. The blade 76 is also positioned between the compression surface 60 of compression roller 56 and the patterned facing surface 34 of endless belt 32 so that the blade tip is close to tangential contact with the facing surface 34. The blade 76 should be positioned so that it will not cut the compression surface 60 of the roller 56 or the patterned facing surface 34 of the belt 32. The blade 76 should not interfere with the rotation of the rollers 46, 56 or the movement of the belt 32. Blade orientation may be adjusted so that the tip of the blade is moved closer or farther from the nip between roller 46 and roller 56.

In the preferred embodiment as shown best in FIGS. 2 and 3, as a slab 80 of cellular material, such as polyurethane foam, is fed between the compression surface 60 of compression roller 56 and the patterned facing surface 34 of the endless belt 32, the slab 80 is compressed by the rollers 46, 56. When the slab 80 travels into the nip or space between the rollers 46, 56, portions of the compressed slab material are held within the recesses 36 defined within the facing surface 34 of the belt 32.

Knife blade 76 cuts transversely portions of the slab 80 just as the slab 80 emerges from between the compression rollers 46, 56. As shown in FIG. 3, the cuts into the slab 80 are made in the regions corresponding to those regions in which slab material had been compressed within recesses 36 defined in the facing surface 34 of the belt 32. A portion of the material that was held within a recess in the belt is cut away from the slab before the compressed cellular material is able to recover to its uncompressed state as it emerges from the compression rollers. Portions of the slab surface not compressed into the recesses or voids in the facing surface 34 of the belt 32 may or may not be cut, depending upon the position of the blade 76.

After the slab is cut as it emerges from the rollers, the cut-away portions 88 are removed as waste in this example, leaving a resulting profiled cellular material 90. The resulting product 90 has recesses 92 substantially corresponding in shape to the recesses 36 provided in the patterned face surface 34 of the endless belt 32. Slabs of cellular material may thus be provided with profiled surfaces with an endless array of patterns, whether symmetrical or nonsymmetrical, simple or complex, or repeating or non-repeating. For example, alternatively the cut-away portion 88 might be a separate profiled cellular material product 90.

Preferably, only portions of the slab that have been compressed into recesses or voids are cut away, resulting in less waste to remove from the surface of the slab as it emerges from the cutting apparatus. In contrast to prior cutting methods, the waste material does not fall away and contaminate the apparatus, but is carried away by the belt 32. The waste may then be swept or vacuumed off the belt as it continues to travel along its path defined by the rollers 18, 28.

Long slabs of cellular material may be fed continuously into and shaped by the continuous platform cutting apparatus. The apparatus may be used to cut multiple products continuously from a single slab of material. The recesses formed in a single patterned platform may be arranged in separate configurations for different products. Alternately, repeating recess patterns may be formed in the patterned platform. In addition, patterned platforms of different lengths may be used to form finished cut products of different lengths.

An example of a profile-cut product 300 made according to the invention is shown in FIGS. 5 and 6. The profile cut product 300 represents a cellular polymer insulating barrier or underlayment that will be installed in the interior of a motor vehicle between the floor surface and the carpeting. The upper surface 310 of the underlayment has been cut to provide complex patterns of recesses or voids. As shown in FIG. 6, generally rectangular-shaped recesses 312 have been cut into the surface of the product 300. In addition, more complex shaped recesses, such as interconnecting generally oval-shaped recesses 314 and interconnecting straight-edged and curved-edged recesses 316, may be cut into the cellular material. For the underlayment for a motor vehicle, preferably one surface, here what has been referred to as the upper surface 310, is cut and the opposite surface remains uncut. The cut surface of the underlayment is placed adjacent to the motor vehicle surface so that the voids and recesses in the underlayment mate with shaped portions projecting from the vehicle surface. In this manner, the underlayment may be provided so as to match the contour of the vehicle interior surface. Once the underlayment is installed in the vehicle, carpet or other covering may be installed adjacent to the uncut and generally smooth surface of the underlayment.

The depth of the recesses 36, 37 of the belt 32 are typically a small fraction of the depth of the corresponding cuts to be made in the surface of the foam material 80. Because of the compression factor of the foam against the pattern belt 32, a shallow depression 36, 37 in the pattern belt 32 yields a much deeper depression in the foam. For example, a ⅝ inch thick sheet of foam material compressed against a depression 36 of 20 thousands of an inch in the patterned belt, in the apparatus 10 described above, yielded approximately a ½ inch deep depression in the foam sheet 80. The spacing between the belt surface 34 and the roller surface 56, if all other factors are equal, determines the compression factor of the foam and consequently the ratio of patterned belt depth to foam cut depth. The depth of cut in the foam can be reduced for a given pattern belt recess depth by increasing the spacing between the roller surface 56 and the belt surface 34, thus reducing the compression factor.

For certain applications, it may be desired to cut both the upper and lower surfaces of a slab of cellular material. If the embodiment of the invention shown in FIGS. 1–3 is used for this purpose, once the slab has been fed between the compression rollers and cut on one side, the slab may then be inverted and fed between the compression rollers so that it may be profile-cut on the opposite surface.

The endless belt 32 preferably is formed from a flexible material such as rubber or silicone rubber or urethane. The belt 32 is thick enough to withstand the compressive forces, preferably about 0.375 inches or more, and has a durometer of about 35 or higher. Alternatively, the belt may be formed of fiberglass reinforced polyurethane or other composite materials suitable for endless belts.

As shown in FIG. 4 in an alternate embodiment 200, rather than using an endless belt, the patterned platform may be constructed as a continuous or endless series of interlinked plates or panels 208 driven by chain and sprocket. The series of plates 208, preferably formed from metal for other sturdy substrate, are mounted on shafts 210. The shafts 210 are held for rotation within bearing sleeves 212. Y-shaped follower bars 214 are connected at one end to the shafts 210 and at the other two ends to pin members 204 holding together the links 202 of a chain. The chain links 202 are driven by sprockets (not shown), which in turn are driven by motors (not shown).

The plates 208 may define one or more recesses 216, or portions of recesses 216. The recesses may be cut through a portion or through the entire thickness of a plate. The recesses may be formed in rectangular, circular or other geometric shape. The recesses may be cut in non-uniform, non-symmetrical and not repeating shapes. The recesses need not be contained wholly within a single plate. Rather, a recess defined by one plate may complement the recess defined by an adjacent plate to form larger or more complex recess shapes.

When a series of plates are used as the patterned platform, the slab of cellular material will be pressed against the plates by a compression roller (not shown in FIG. 4) so that a portion of the material is compressed into the recesses in the plates and is cut away from the slab by a knife blade just as the cellular material emerges from the compression roller. A support platform 222 is provided below the plates 208 to support the plates when compression forces are exerted on them by the compression roller.

The apparatus according to this invention might be used to make profile cut products for a variety of end uses. In addition to motor vehicle carpet systems, profile cut products might be made for other vehicle interior applications, such as headliners, side panels and dash panels. Profile cut products might also be used for mattresses, mattress pads, pillows, furniture cushions, filters, sports equipment, footwear components and packaging. The above list is intended to be representative and not exhaustive as to all the possible applications for the invention.

While preferred embodiments of the invention have been described and illustrated here, various changes, substitutions and modifications to the described embodiments will become apparent to those of ordinary skill in the art without thereby departing from the scope and spirit of the invention.

We claim:

1. An apparatus for shaping a slab of cellular polymer material by cutting and removing portions of the material from an outer surface of the slab, comprising:
   a compression roller and a cooperating support surface, said compression roller rotatable on an axis and having its outer surface spaced apart from the support surface to define a predetermined gap therebetween so that the roller exerts a compressive force against the slab of cellular polymer material as said slab is passed through said gap between the compression roller and the support surface;
   a patterned belt having an outer surface and being interposed in the gap between the compression roller and the support surface and movable with relation thereto, said outer surface of said patterned belt defining at least one recess to receive a portion of the cellular polymer material when a region of the slab is passed through said gap and compressed between the compression roller and the support surface, and wherein said belt is driven by a drive roller; and
   a blade for cutting the cellular polymer material as the slab emerges from the gap between the compression roller and the support surface, said blade positioned adjacent the gap and in substantially closely adjacent relationship with the outer surface of the patterned belt to cut a portion of the cellular material received within the recess of the patterned belt from the slab.

2. The apparatus of claim 1, wherein the support surface is part of a cooperating support roller.

3. The apparatus of claim 1, wherein the patterned belt is an endless flexible belt.

4. The apparatus of claim 3, wherein the at least one recess comprises a plurality of recesses.

5. The apparatus of claim 4, wherein the plurality of recesses defines a non-symmetrical, non-repetitive pattern.

6. The apparatus of claim 3, wherein the belt is formed from at least one material selected from the group consisting of: rubber, silicone rubber, urethane, and fiberglass-reinforced polyurethane, and the belt has a durometer of at least about 35.

7. The apparatus of claim 3, wherein the patterned belt has an inner surface that frictionally engages the support surface.

8. The apparatus of claim 1, wherein the blade is positioned closely adjacent to the outer surface of the patterned belt so that material is cut from the slab solely from the portion of the cellular material that is received within the recess of the patterned belt.

9. The apparatus of claim 1, wherein the blade is positioned adjacent to the outer surface of the patterned belt so that a layer of material is cut from the entire surface of the slab and a greater amount of material is cut from the slab from the portion of the cellular material that is received within the recess of the patterned belt.

10. The apparatus of claim 1, wherein the patterned belt has a set of ribs that engage a mating set of ribs on the drive roller so that rotation of the drive roller drives the belt.

11. The apparatus of claim 10, wherein a motor drives the drive roller and the drive roller causes the belt to travel at a speed synchronized with the speed at which the outer surface of the drive roller is driven.

12. An apparatus for shaping a continuously fed slab of cellular polymer material by cutting and removing portions of the material from an outer surface of the slab, comprising:

a compression roller and a cooperating support surface, said compression roller rotatable on an axis and having its outer surface spaced apart from the support surface to define a predetermined gap therebetween so that the roller exerts a compressive force against the slab of cellular polymer material as said slab is fed continuously through said gap between the compression roller and the support surface;

a continuous patterned belt having an outer surface and being interposed in the gap between the compression roller and the support surface and movable with relation thereto, said outer surface of said patterned belt defining at least one recess to receive a portion of the cellular polymer material when a region of the slab is passed through said gap and compressed between the compression roller and the support surface, and wherein said belt is driven by a drive roller; and a blade for cutting the cellular polymer material as the slab emerges from the gap between the compression roller and the support surface, said blade positioned adjacent the gap and in substantially closely adjacent relationship with the outer surface of the patterned belt to cut a portion of the cellular material received within the recess of the patterned belt from the slab.

13. The apparatus of claim 12, wherein the patterned belt is an endless belt.

14. The apparatus of claim 13, wherein the at least one recess comprises a plurality of recesses.

15. The apparatus of claim 13, wherein the belt is formed from at least one material selected from the group consisting of: rubber, silicone rubber, urethane, and fiberglass-reinforced polyurethane, and the belt has a durometer of at least about 35.

16. The apparatus of claim 13, wherein the patterned belt has an inner surface that frictionally engages the support surface.

17. The apparatus of claim 12, wherein the patterned belt has a set of ribs that engage a mating set of ribs on the drive roller so that the rotation of the drive roller drives the belt.

18. The apparatus of claim 17, wherein a motor drives the drive roller and the drive roller causes the belt to travel at a speed synchronized with the speed at which the outer surface of the drive roller is driven.

* * * * *

UNITED STATES PATENT AND TRADEMARK OFFICE
CERTIFICATE OF CORRECTION

PATENT NO. : 6,546,836 B1  Page 1 of 1
APPLICATION NO. : 08/899292
DATED : April 15, 2003
INVENTOR(S) : Denys Denney et al.

It is certified that error appears in the above-identified patent and that said Letters Patent is hereby corrected as shown below:

On the Cover Page, the Notice should reflect that "the term of this patent is extended or adjusted under 35 U.S.C. 154(b) by 610 days."

Signed and Sealed this

Fifteenth Day of January, 2008

JON W. DUDAS
*Director of the United States Patent and Trademark Office*